United States Patent [19]

Oota et al.

[11] 4,421,974

[45] Dec. 20, 1983

[54] ELECTRIC RICE COOKER

[75] Inventors: Hiroyuki Oota, Iwakura; Terutaka Aoshima, Toyohashi; Kenji Yamamori; Ryuho Narita, both of Nagoya, all of Japan

[73] Assignee: Tokyo Shibaura Denki Kabushiki Kaisha, Kawasaki, Japan

[21] Appl. No.: 458,873

[22] Filed: Jan. 18, 1983

[30] Foreign Application Priority Data

Jan. 29, 1982 [JP] Japan ................................ 57-14111

[51] Int. Cl.³ ............................................ F27D 11/02
[52] U.S. Cl. .................................... 219/441; 219/438; 219/433; 219/492; 219/494; 99/333
[58] Field of Search .................. 99/332, 333; 219/429, 219/430, 432, 433, 438, 439, 441, 442, 492, 493, 494, 509, 510

[56] References Cited

U.S. PATENT DOCUMENTS

| 4,234,783 | 11/1980 | Aoshima | 219/441 |
| 4,241,288 | 12/1980 | Aoshimia et al. | 219/441 |
| 4,313,051 | 1/1982 | Aoshima | 219/441 |
| 4,315,138 | 2/1982 | Miwa | 219/441 |
| 4,315,139 | 2/1982 | Onishi et al. | 219/441 |
| 4,362,923 | 12/1982 | Aoshima | 219/441 |

FOREIGN PATENT DOCUMENTS 55-45434  3/1980  Japan .
56-91527 12/1981  Japan .

Primary Examiner—Volodymyr Y. Mayewsky
Attorney, Agent, or Firm—Cushman, Darby & Cushman

[57] ABSTRACT

An electric rice cooker is disclosed which has a cooking kettle containing rice and water, a thermal insulating frame and an electric heater provided adjacent to the outside surface of the kettle. The electric rice cooker performs auxiliary cooking, such as "twice cooking", for effectively converting beta-starch to alpha-starch after main cooking is completed. The auxiliary cooking operating time is properly determined in accordance with the actual amount to be cooked when every cooking operation is performed. The actual amount to be cooked is detected by a control circuit arranged in a case in accordance with a change in actual kettle temperature measured by a thermistor after a heater is deenergized, that is, in accordance with a peak temperature obtained by "after heat".

9 Claims, 3 Drawing Figures

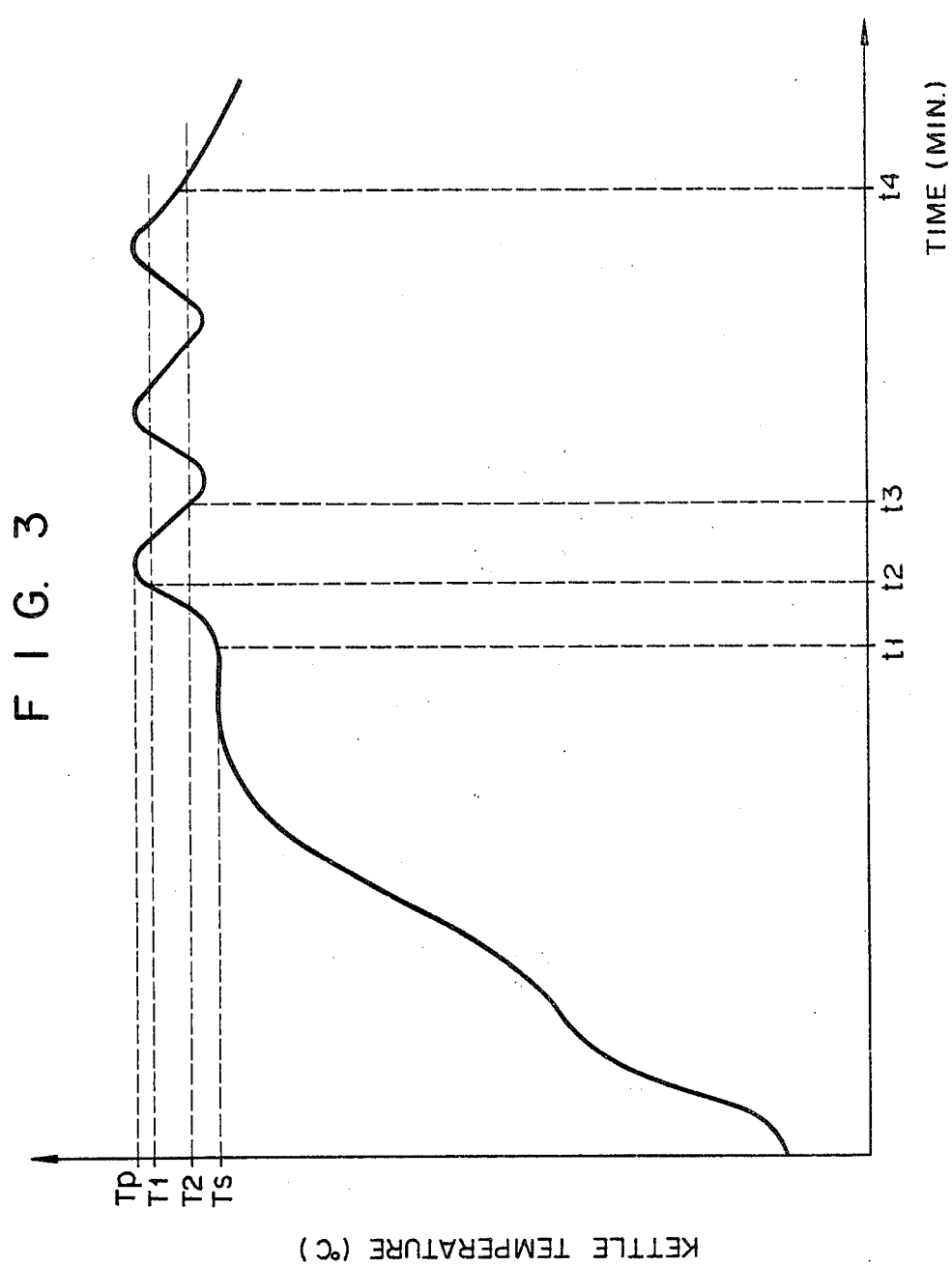

ELECTRIC RICE COOKER

BACKGROUND OF THE INVENTION

The present invention relates to an electric rice cooker and, more particularly, to an electric rice cooker for properly performing auxiliary cooking such as twice cooking and/or steam (ripening) so as to effectively convert beta-starch to alpha-starch after main cooking of rice and water contained in a cooking pot or kettle is completed.

A technique is already known among those skilled in the art in which auxiliary cooking in the "twice cooking" mode is performed to reheat the cooked rice in the cooking kettle, thereby effectively converting beta-starch to alpha-starch and evaporating excessive moisture to cook tasty rice. However, in auxiliary cooking in the "twice cooking" mode, the start time and the operating period of the heater are solely determined by a timer circuit or the like independently of the actual conditions of the cooking kettle. Therefore, when the user wishes to cook a small amount of rice, the bottom portion of the cooked rice gets browned. On the contrary, when the user wishes to cook a large amount of rice, beta-starch cannot be sufficiently converted to alpha-starch. As a result, it is difficult to control the heater in auxiliary cooking in the twice cooking mode in accordance with the actual amount of rice and water.

SUMMARY OF THE INVENTION

It is, therefore, an object of the present invention to provide a new and improved electric rice cooker for properly performing auxiliary cooking to effectively convert beta-starch to alpha-starch in every cooking operation in accordance with the actual amount of rice and water.

According to the electric rice cooker of the present invention, auxiliary cooking is performed to convert beta-starch to alpha-starch immediately after main cooking is completed. Auxiliary cooking includes "twice cooking". The duration time of auxiliary cooking is changed in every cooking operation in accordance with the actual amount of rice to be cooked. When the amount of rice to be cooked is large, the duration time of auxiliary cooking is lengthened. However, when the amount to be cooked is small, the duration time of auxiliary cooking is shortened. In order to detect the actual amount to be cooked, the rate of change of temperature of the cooking kettle during the heat interruption period or during the "OFF" time of the heater is measured. In accordance with the changes in temperature of the cooking kettle, the actual amount to be cooked is classified in different ranks.

Although the heater is turned off to complete main cooking, the kettle temperature does not abruptly decrease, but is temporarily increased by "after heat". A peak value of the kettle temperature always appears after the heater is turned off. The peak value is closely associated with the actual amount to be cooked; specifically, the peak value is inversely proportional to the actual amount to be cooked. Therefore, an actual amount to be cooked can be determined by data of the corresponding peak temperature. A timer period determined by the peak temperature which is inversely proportional thereto, is defined as the duration time of the auxiliary cooking. Therefore, auxiliary cooking is performed during a time period defined above, thereby properly converting beta-starch to alpha-starch and cooking a desired amount of tasty rice.

BRIEF DESCRIPTION OF THE DRAWINGS

The present invention is best understood by reference to the accompanying drawings, in which:

FIG. 3 is a graph for explaining the change in the actual kettle temperature (°C.) as a function of time (min) of the cooking kettle housed in the electric rice cooker of FIG. 1.

DETAILED DESCRIPTION OF THE PREFERRED EMBODIMENT

Figure 1:
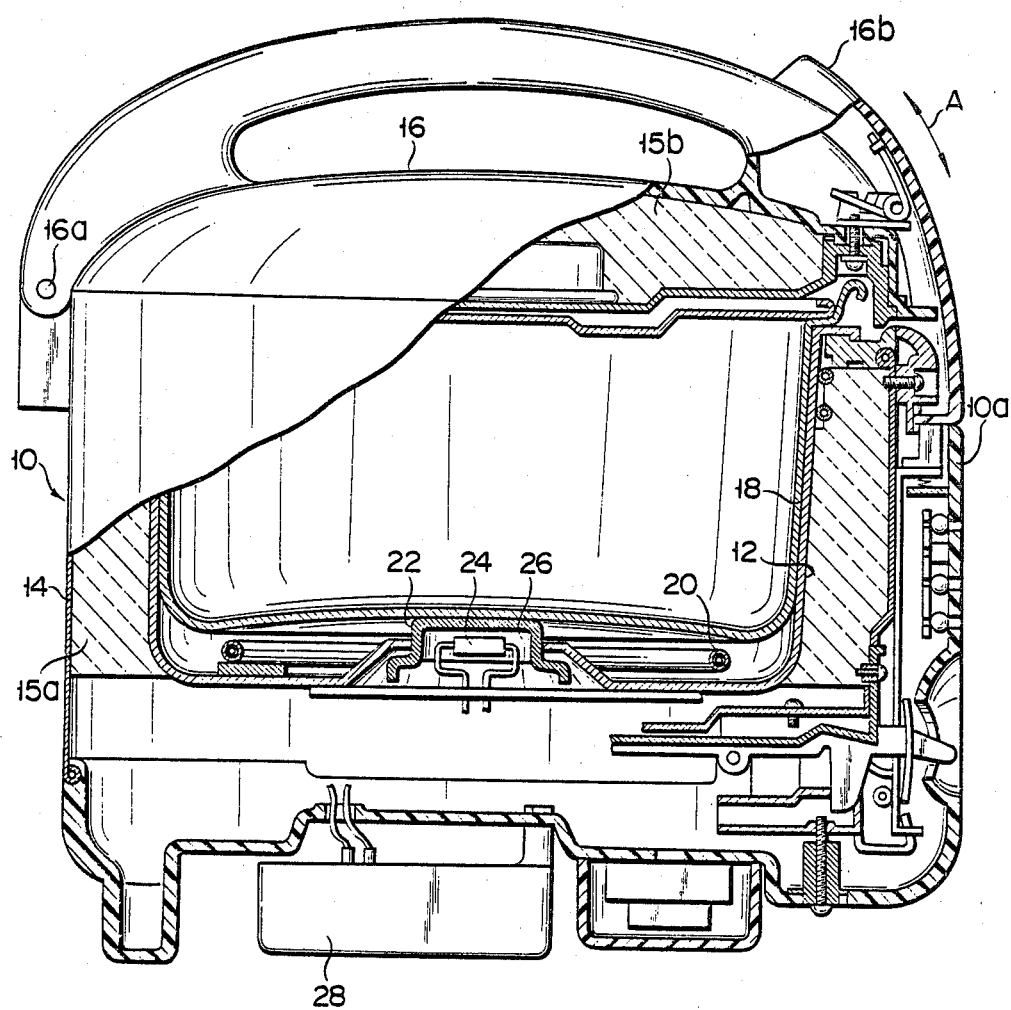
FIG. 1 is a partially cutaway side view showing the internal structure of an electric rice cooker according to an embodiment of the present invention.

Referring now to FIG. 1, there is illustrated an electric rice cooker in accordance with one preferred embodiment of the present invention. In FIG. 1, a main body 10 includes an inner case 12 and an outer case 14. A thermal insulating material 15a is sandwiched between the inner and outer cases 12 and 14. A lid member 16 has a thermal insulating material 15b therein. The lid member 16 is mounted at an upper opening (not shown) of the main body 10 to be pivotal or swingable in the direction indicated by arrow A about a hinge shaft 16a. When the lid member 16 is tightly closed, an engaging member 16b which is disposed opposing the hinge shaft 16a of the main body 10 tightly closes the main body 10. The internal space of the main body 10 is thus thermally insulated from the outer atmosphere.

A desired amount of rice (not shown) to be cooked and a suitable amount of water (not shown) for cooking it, are contained in a cooking pot or kettle 18 housed in the inner case 12 of the main body 10. A heater 20 is provided on the inner surface of the bottom of the inner case 12 to heat the kettle 18 detachably mounted in the inner case 12. When the kettle 18 with rice and water contained therein is mounted in the main body 18, the heater 20 comes closer to the outer bottom surface of the kettle 18. Therefore, the heater 20 can directly heat the kettle 18 with rice and water contained therein.

A cup-shaped heat sensor 22 is disposed at substantially the center of the inner bottom surface of the inner case 12 so as to be brought into tight and elastic contact with the outer bottom surface of the kettle 18 placed in the inner case 12. The heat sensor 22 has a thermistor 24 which serves as a temperature sensing element therein. The thermistor 24 is stably encapsulated within a molded member 26 which comprises a good heat-conductive material. The actual temperature of the kettle 18 is detected by the heat sensor 22. The thermistor 24 changes its resistance in accordance with the detected temperature. A case 28 is disposed at the outer bottom portion of the outer case 14 of the main body 10 and has a cooking control section.

Figure 2:
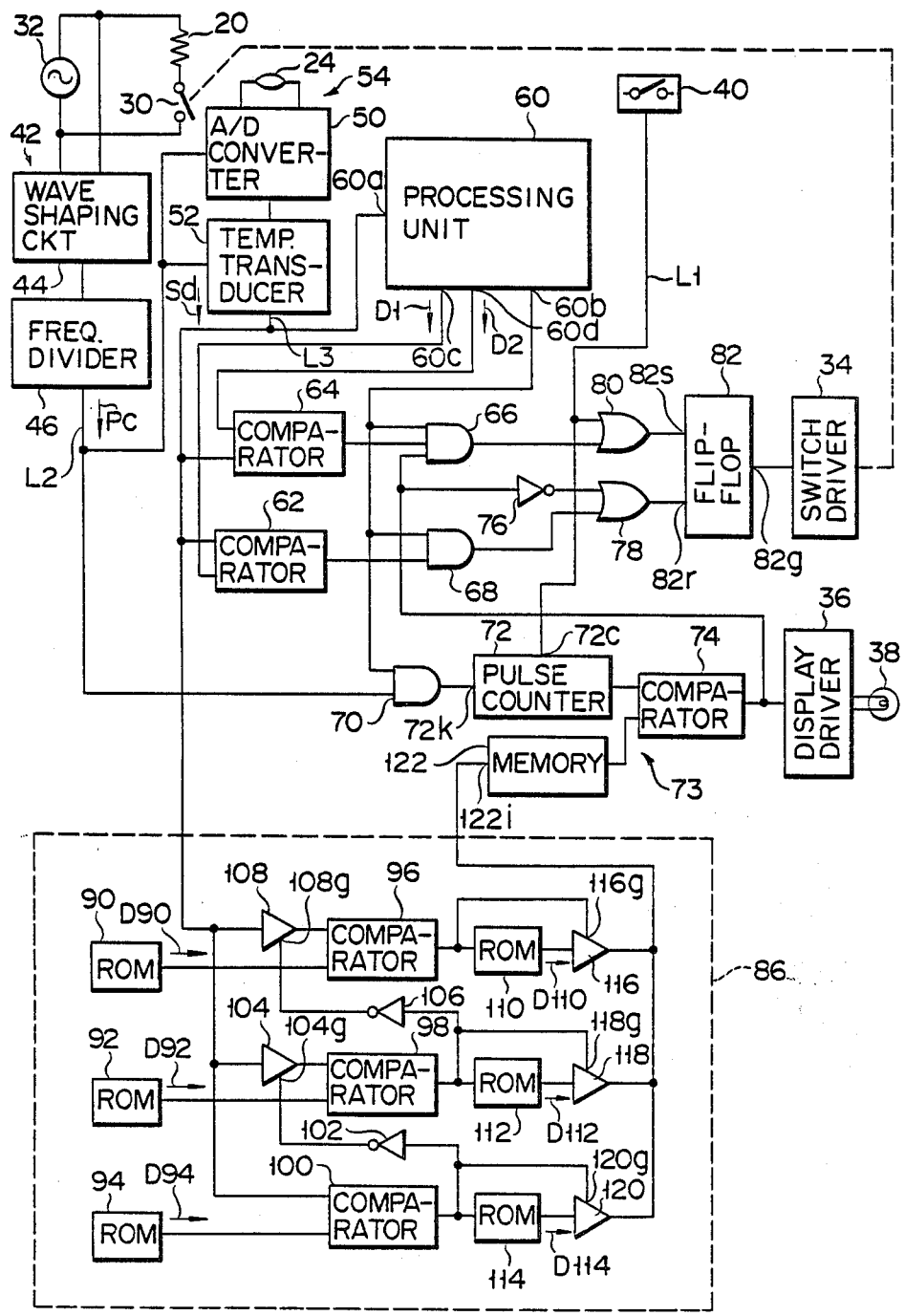
FIG. 2 is a circuit diagram showing the overall configuration of the electric rice cooker of FIG. 1.

The cooking control section arranged in the case 28 is shown in detail in FIG. 2. The heater 20 is electrically connected to a home AC power source 32 through a normally open switch 30 via a known connecting means (not shown) such as a set of plug and socket. The normally open switch (to be referred to as a "heater switch" hereinafter) 30 is turned on by a switch driver 34 only when the switch driver 34 receives a signal of logic level "1" (logic level "1" signal). Reference numeral 36 denotes a display driver for driving a cooking indicator lamp 38 only when the display driver 36 receives a logic level "1" signal. A switch to be manually operated by the user functions as a cooking start switch 40 (to be referred to as a "cooking switch" hereinafter). When the user presses the cooking switch 40, it produces a logic level "1" signal, which is supplied to a signal line L1.

Both terminals of the AC power source 32 are connected to a clock pulse generator 42 which includes a wave shaping circuit 44 and a frequency divider 46. The wave shaping circuit 44 shapes the waveform of the output from the AC power source 32. The frequency divider 46 is connected to the wave shaping circuit 44 to frequency-divide the output from the wave shaping circuit 44. The frequency divider 46 is arranged to produce a clock pulse signal Pc of, for example, 1Hz frequency in accordance with a known manner, which is then supplied onto a signal line L2. The clock pulse signal Pc is simultaneously supplied to an A/D converter 50 connected to the thermistor 24, and to a temperature transducer 52 connected to the A/D converter 50. The A/D converter 50 receives, as an input signal, an analog change in resistance of the thermistor 24. Every time the A/D converter 50 further receives the clock pulse signal Pc from the clock pulse generator 42, it converts the analog resistance value into a digital resistance value. The temperature transducer 52 receives the output from the A/D converter 50 and transduces it into a digital temperature value. The temperature transducer 52 then supplies a digitized temperature detection signal Sd which corresponds to the actual kettle temperature Td onto a signal line L3. The thermistor 24, the A/D converter 50 and the temperature transducer 52 constitute a kettle temperature measuring circuit 54.

The temperature detection signal Sd is supplied to an input terminal 60a of a processing unit 60. The processing unit 60 performs arithmetic operation and detects that the actual kettle temperature Td represented by the temperature detection signal Sd reaches a predetermined value (corresponding to the boiling temperature of water in the cooking kettle 18) and is increased again. An output terminal 60b of the processing unit 60 then goes high. At the same time, the processing unit 60 is arranged to produce a data signal D1 representing a cooking completion temperature or "cooked" temperature T1 (corresponding to a temperature, e.g., 115° C.) and a data signal D2 representing a predetermined auxiliary cooking start temperature T2 (corresponding to a temperature, e.g., 105° C.) in the "twice cooking" mode from data output terminals 60c and 60d thereof (where T1>T2, and T1>115° C.). The data signal D1 is supplied to one input terminal of a comparator 62. The temperature detection signal Sd is supplied to the other input terminal of the comparator 62. The comparator 62 compares the actual kettle temperature Ts represented by the temperature detection signal Sd and the temperature T1 represented by the data signal D1. When the temperature Ts is equal to or higher than the temperature T1, the comparator 62 produces a logic level "1" signal. Otherwise, the comparator 62 produces a logic level "0" signal. The data signal D2 is supplied to one input terminal of a comparator 64. The temperature detection signal Sd is supplied to the other input terminal of the comparator 64. The comparator 64 compares the actual kettle temperature Ts and the temperature T2 represented by the data signal D2. When the temperature Ts is equal to or lower than the temperature T2, the comparator 64 produces a logic level "1" signal. Otherwise, it produces a logic level "0" signal.

The output terminal 60b of the processing unit 60 is connected to the first input terminals of a 3-input AND gate 66, and AND gates 68 and 70. The second input terminal of the 3-input AND gate 66 is connected to the output terminal of the comparator 64. The output terminal of the comparator 62 is connected to the second input terminal of the AND gate 68. The second input terminal of the AND gate 70 is connected to the signal line L2 connected to the frequency divider 46. The output terminal of the AND gate 70 is connected to a clock input terminal 72K of a pulse counter 72 included in a timer circuit 73. A clear terminal 72c of the pulse counter 72 is connected to the signal line L1 which is connected to the cooking switch 40. The pulse counter 72 counts clock pulses received at the clock input terminal 72K thereof. Furthermore, when the pulse counter 72 receives a logic level "1" signal at the clear terminal 72c thereof, the count of the pulse counter 72 is cleared. The output terminal of the pulse counter 72 is connected to the first input terminal of a comparator 74. The output terminal of the comparator 74 is connected to one input terminal of an OR gate 78 through an inverter 76, to a display driver 36, and to the third input terminal of the 3-input AND gate 66. The OR gate 78 has the other input terminal connected to the output terminal of the AND gate 68. The output terminal of the 3-input AND gate 66 is connected to one input terminal of an OR gate 80 which has the other input terminal connected to the cooking switch 40. The outputs of the OR gates 80 and 78 are respectively connected to a set terminal 82s and a reset terminal 82r of an R-S flip-flop 82. An output terminal 82q of the R-S flip-flop 82 is connected to the switch driver 34.

The temperature detection signal Sd is further supplied to a circuit 86 for measuring the actual amount to be cooked (referred to as a "cooking amount measuring circuit" hereinafter). The cooking amount measuring circuit 86 includes three data memories 90, 92 and 94 each comprising a ROM. The data memories 90, 92 and 94 store data signals D90, D92 and D94 of reference temperatures T90, T92 and T94 (T90=115° C., T92=120° C., and T94=125° C.), respectively. The data memories 90, 92 and 94 are respectively connected to the first input terminals of comparators 96, 98 and 100. The comparator 100 has the second input terminal which directly receives the temperature detection signal Sd. The comparator 100 compares the actual kettle temperature Td represented by the temperature detection signal Sd and the reference temperature T94 (i.e., 125° C.) represented by the data signal D94 read out from the data memory 94. When the temperature Td is equal to or higher than the temperature T94, the comparator 100 produces a logic level "1" signal. Otherwise, it produces a logic level "0" signal. The output terminal of the comparator 100 is connected through an inverter 102 to a gate terminal 104g of a transfer gate 104. The transfer gate 104 is connected between the signal line L3 and the second input terminal of the comparator 98. While the transfer gate 104 receives a logic level "1" signal at the gate terminal 104g thereof, it allows transmission of the temperature detection signal Sd therethrough so as to supply it to the comparator 98. When the comparator 98 receives the temperature detection signal Sd, it compares the actual kettle temperature Td and the reference temperature T92 (=120° C.) represented by the data signal D92 read out from the data memory 92. When the actual kettle temperature Td is equal to or higher than the temperature T92, the comparator 98 produces a logic level "1" signal. Otherwise, it produces a logic level "0" signal. The output terminal of the comparator 98 is connected through an inverter 106 to a gate terminal 108g of a transfer gate 108. The transfer gate 108 has the same function as the transfer gate 104. When the temperature detection signal Sd is supplied from the transfer gate 108 to the second terminal of the comparator 96 through the transfer gate 108, the comparator 96 compares the actual kettle temperature Td and the reference temperature T90 (=115° C.) represented by the data signal D90 read out from the data memory 90. When the actual kettle temperature Td is equal to or higher than the reference temperature T90, the comparator 96 produces a logic level "1" signal. Otherwise, it produces a logic level "0" signal.

The output terminals of the comparators 96, 98 and 100 are respectively connected to transfer gates 116, 118 and 120 through data memories 110, 112 and 114 each comprising a ROM. The data memories 110, 112 and 114 respectively store time data D110, D112 and D114 of timer reference time intervals t110, t112, and t114 (e.g., t110=1200 sec, t112=900 sec, and t114=600 sec). The data memories 110, 112 and 114 each generate the time data D110, D112 and D114 when logic level "1" signals are supplied thereto. The output terminals of the comparators 96, 98 and 100 are directly connected to gate terminals 116g, 118g and 120g of the transfer gates 116, 118 and 120, respectively. While the transfer gates 116, 118 and 120 receive the logic level "1" signals at their gate terminals, they allow the data signals D110, D112 and D114 from the data memories 110, 112 and 114 to pass therethrough. The output terminals of the transfer gates 116, 118 and 120 are commonly connected to the second input terminal of the comparator 74 through a timer data memory 122. The timer data memory 122 stores data of the time interval t110, t112 or t114 which is represented by the time data signal D110, D112 or D114 received at its input terminal 122i and does not update the content even if data is received which is greater than the stored data after the data storage is completed during a given cooking operation.

The mode of operation of the electric rice cooker according to an embodiment of the present invention will be described with reference to the graph showing a change in kettle temperature as a function of time in FIG. 3. A desired amount of rice and a suitable amount of water are contained in the kettle 18 shown in FIG. 1 and the lid member 16 is closed. In this condition, when the user presses the cooking switch 40, the cooking switch 40 supplies a logic level "1" signal to the signal line L1. The pulse counter 72 is cleared in response to the logic level "1" signal. At the same time, since the "1" logic level signal is supplied to the R-S flip-flop 82 through the OR gate 80, the R-S flip-flop 82 is set so that its output terminal 82q produces a logic level "1" signal. In response to this signal, the switch driver 34 causes the heater switch 30 to turn on. Power is then supplied from the AC power source 32 to the heater 20. The heater 20 heats the kettle 18, thus initiating the cooking operation (main cooking).

When the pulse counter 72 is cleared, the timer data memory 122 stores timer data of a time interval t110, t112 or t114 which is used in the immediately previous cooking operation. The count of the pulse counter 72 is smaller than the output from the timer data memory 122. The comparator 74 then supplies a logic level "1" signal to the display driver 36. The indicator lamp 38 is then driven by the display driver 36, so that the user can visually check the start of the cooking operation.

Thereafter, the kettle temperature is increased over time upon heating of the heater 20, as shown in FIG. 3. The kettle temperature is measured by the kettle temperature measuring circuit 54, and the temperature detection signal Sd is produced by the temperature transducer 52 at a period of the clock pulse signal Pc, that is, at every one second.

When water in the kettle 18 is boiled upon heating of the heater 20, the kettle temperature reaches the temperature Ts, and its temperature gradient becomes flat temporarily. When the kettle temperature is abruptly increased from time t1, the processing unit 60 detects this change in kettle temperature. The processing unit 60 then produces a logic level "1" signal from its output terminal 60b. At the same time, the processing unit 60 produces the data signal D1 indicating the "cooked" temperature T1 and the data signal D2 indicating the start temperature of auxiliary cooking in the twice cooking mode. The logic level "1" signal from the processing unit 60 is supplied to the AND gates 66, 68 and 70. In response to this signal, the AND gate 70 allows the clock pulse signal Pc to pass therethrough, thereby supplying the clock pulse signal Pc to the clock input terminal 72K of the pulse counter 72. Thus, the pulse counter 72 starts counting the clock pulses and the timer circuit 73 starts operating.

Meanwhile, the "cooked" temperature T1 represented by the data signal D1 from the processing unit 60 is compared with the temperature detection signal Sd by the comparator 62. When the actual kettle temperature Td increased by the heater 20 becomes equal to or higher than the "cooked" temperature T1, the comparator 62 produces a logic level "1" signal which is then supplied to the AND gate 68. At the same time, the AND gate 68 receives the logic level "1" signal from the processing unit 60. As a result, the AND gate 68 produces a logic level "1" signal. This signal is supplied to the reset input terminal 82r of the R-S flip-flop 82 through the OR gate 78, thereby resetting the R-S flip-flop 82. The logic level "1" signal is not supplied to the switch driver 34 any longer, so that the heater switch 30 is turned off, and the heater 20 is then deenergized. Thereafter, steaming is performed at time interval which is controlled by the timer circuit 73.

After the heater 20 is deenergized, the kettle temperature is not abruptly decreased but is slightly increased by "after heat". Since the heat generated by the heater 20 and applied to the kettle 18 is constant, a peak temperature Tp of the kettle after power is withdrawn, is inversely proportional to the cooking amount. The cooking amount measuring circuit 86 of the present invention detects the peak temperature Tp of the kettle to determine the actual amount to be cooked in every cooking operation in accordance with the peak temperature Tp.

At time t2 when the heater 20 is deenergized, the actual kettle temperature Td is equal to the "cooked" temperature T1, so that the relationships among the actual kettle temperature Td and the reference temperatures T90, T92 and T94 whose data are stored in the data memories 90, 92 and 94 are given below:

$$Td < T90 < T92 < T94 \tag{1}$$

The comparator 100, which directly receives the temperature detection signal Sd, produces a logic level "0" signal. This signal is inverted by the inverter 102 and is then supplied as a logic level "1" signal to the transfer gate 104, thereby opening the transfer gate 104. The temperature detection signal Sd is also supplied to the comparator 98 through the transfer gate 104. The comparator 98 produces a logic level "0" signal in accordance with inequality (1). This logic level "0" signal is inverted by the inverter 106 and is then supplied, as a logic level "1" signal, to the transfer gate 108. As a result, the temperature detection signal Sd passes through the transfer gate 108 and is supplied to the comparator 96. The comparator 96 produces a logic level "0" signal in accordance with inequality (1). In other words, while the actual kettle temperature Td satisfies inequality (1), the temperature detection signal Sd is supplied to the comparators 96, 98 and 100. As a result, the comparators 96, 98 and 100 produce signals of logic level "0", respectively.

When the kettle temperature is increased by "after heat" and satisfies the following inequality:

$$T90 \leq Td < T92 < T94 \qquad (2)$$

a logic level "1" signal is produced by the comparator 96 and is supplied to the gate terminal 116g of the transfer gate 116. The transfer gate 116 is thus opened to supply the data signal D110 which indicates the time interval t110 (=1200 sec) and is stored in the data memory 110 to the timer data memory 122. The timer data memory 122 then stores the time interval t110 as the duration time of auxiliary cooking in the twice cooking mode. When the actual kettle temperature Td reaches its peak value while it satisfies inequality (2), and when the actual kettle temperature Td is decreased without exceeding the reference temperature T92, that is, when the cooking amount is relatively large, the time interval T110 is regarded as the time interval of auxiliary cooking in the twice cooking mode.

When the cooking amount is relatively small, the kettle temperature is increased by "after heat" and satisfies the following inequality:

$$T90 < T92 \leq Td < T94 \qquad (3)$$

the comparator 98 supplies a logic level "1" signal to the gate terminal 118g of the transfer gate 118. The transfer gate 118 is then opened to allow transmission of the data signal D112, which indicates the time interval t112 (=900 sec) and is stored in the data memory 112, to the timer data memory 122. Since the time interval t112 is shorter than the time interval t110, the storage content of the timer data memory 122 is updated as the time interval t112. Thereafter, when the actual kettle temperature Td is further increased and satisfies the following inequality:

$$T90 < T92 < T94 \leq Td \qquad (4)$$

the comparator 100 produces a logic level "1" signal. In response to this signal, the transfer gate 120 is opened to allow transmission of the data signal D114, which indicates the timer reference time interval t114 (=600 sec) and is stored in the data memory 114, to the timer data memory 122. The storage content of the timer data memory 122 is updated again to the reference time interval t114 (=600 sec).

When the peak temperature does not reach T92=120° C. in accordance with inequality (1) after the heater 20 is deenergized and the actual kettle temperature is increased by "after time", the cooking amount measuring circuit 86 determines that the cooking amount is large and allows to add data of 1,200 seconds to the preset time data stored in the timer data memory 122 so as to convert beta-starch to alpha-starch in the ripening mode including the "twice cooking". When the peak temperature Tp of the kettle is equal to or higher than the reference temperature T92 (=120° C.) in accordance with inequality (2), the cooking amount measuring circuit 86 determines that the cooking amount is intermediate. The cooking amount measuring circuit 86 gives a ripening time of 900 sec to the timer data memory 122. However, when the peak temperature of the kettle 18 is equal to or higher than the reference temperature T94 (=125° C.) in accordance with inequality (3), the cooking amount measuring circuit 86 determines that the cooking amount is small. The cooking amount measuring circuit 86 gives a steaming time of 600 sec to the timer data memory 122.

A case will be described in which a great amount of rice and water is contained in the kettle 18. In this case, data of the timer reference time interval t110 (=1,200 sec) is stored in the timer data memory 122. At time t2 at the "cooked" temperature, a logic level "1" signal is produced from the output terminal 60b of the processing unit 60. Therefore, the clock pulse signal Pc is supplied to the pulse counter 72 through the AND gate 70, so that the pulse counter 72 starts counting the clock pulses.

The data signal D2 which indicates the temperature T2 is supplied from the output terminal 60d of the processing unit 60 to the comparator 64. When the actual kettle temperature which is gradually decreased after the heater 20 is deenergized and the peak temperature of the kettle 18 is obtained becomes equal to or lower than the temperature T2, the comparator 64 produces a logic level "1" signal. The logic level "1" signal is supplied to the second input terminal of the 3-input AND gate 66. At the same time, the logic level "1" signal from the output terminal 60b of the processing unit 60, is supplied to the first input terminal of the AND gate 66, while the signal, which is produced by the comparator 74 and is inverted as the signal of logic level "1" by the inverter 76, is supplied to the third input terminal thereof. Therefore, the 3-input AND gate 66 produces a logic level "1" signal. This signal is supplied to the set input terminal 82s of the R-S flip-flop 82 through the OR gate 80. As a result, the R-S flip-flop 82 is set again to supply the logic level "1" signal to the switch driver 34. The heater switch 30 is turned on, and the heater 20 is then energized, thereby heating the kettle 18 a second time. Thereafter, when the kettle temperature increases by the heater 20 and reaches the "cooked" temperature T1, the heater 20 is deenergized again in the same manner as described above. When the actual kettle temperature is decreased and becomes equal to the temperature T2, the heater 20 is energized again. Such an operation is repeated. When the pulse counter 72 continues to count the clock pulses during the time interval t110 (=1,200 sec) from time t1 to time t4, the comparator 74 produces a logic level "0" signal. This logic level "0" signal is then inverted by the inverter 76 to a logic level "1" signal which is then supplied to the reset input terminal 82r of the R-S flip-flop 82. As a result, the switch driver 34 is operated to turn off the heater switch 30. As a result, the heater 20 is deenergized. At the same time, the display driver 36 is operated to turn off the indicator lamp 38. As described above, the auxiliary cooking for effectively converting beta-starch to alpha-starch, or the ripening including heating operation of twice cooking, is performed.

In the electric rice cooker which is arranged and operated as described above according the embodiment of the present invention, the actual amount to be cooked (the actual cooking amount) is electrically measured by the cooking amount measuring circuit 86 every time a cooking operation is performed. The measured cooking amount is classified as one of the cooking amount ranks. The operating time of the timer 73 circuit is automatically elongated when a great amount of rice is cooked. During the operating time of the timer circuit 73, the heater 20 is repeatedly energized. On the other hand, when the cooking amount is small, the operating time of the timer circuit 73 is automatically shortened. The number of reheatings of the heater 20 is properly decreased during auxiliary cooking in the twice cooking mode. Therefore, the ripening operation including twice cooking can be properly performed to effectively convert beta-starch to alpha-starch under optimal conditions in accordance with the actual amount to be cooked. Cooking trouble such as burning of the cooked rice or insufficient conversion of beta-starch to alpha-starch can be completely prevented.

According to the embodiment described above, since the actual cooking amount is electrically detected, it is precisely and reliably detected, thus eliminating variations in characteristics of rice cookers and simplifying the circuit construction thereof.

The actual cooking amount is determined in accordance with an increase in kettle temperature by "after heat" between time t2 and time t3 after main cooking is performed. The increase in kettle temperature is one of the most conspicuous criteria for measuring the actual cooking amount. Therefore, according to the present invention, the actual amount of rice can be properly and effectively measured without failure.

The time interval, for which the temperature detection signal Sd indicating the actual kettle temperature is supplied to the comparators 96 and 98, is properly controlled by the transfer gates 108 and 104 respectively arranged between the signal line L3 and the comparator 96 and between the signal line L3 and the comparator 98. Therefore, it can be suitably prevented that the logic level "1" signals are simultaneously produced by the comparators 96, 98 and 100 in accordance with comparison results of the actual kettle temperature and a set of reference temperatures T90, T92 and T94. Therefore, the transfer gates 116, 118 and/or 120 will not be simultaneously opened, thereby preventing simultaneous supply of the timer data signals D110, D112 and/or 114 to the timer data memory 122. In this manner, only one proper timer data in accordance with the actual cooking amount is supplied to the timer data memory 122, so that the circuit arrangement for the auxiliary cooking timer is simplified.

Although the present invention has been shown and described with respect to a particular embodiment, nevertheless, various changes and modifications which are obvious to a person skilled in the art to which the invention pertains are deemed to lie within the spirit, scope and contemplation of the invention.

For example, only ripening without the twice cooking may be performed to effectively convert beta-starch to alpha-starch. Auxiliary or second cooking in the twice cooking mode may be performed as needed. Furthermore, in the above embodiment, the operating time of the timer circuit 73 is determined in accordance with the peak value of the temperature detection signal Sd. However, the present invention is not limited to this arrangement. The second cooking temperature level can be arbitrarily changed. The cooking conditions may be changed and set in accordance with a difference between the peak temperature Tp and the temperature Ts.

What we claim is:
1. An electric rice cooking apparatus comprising:
 (a) a cooking kettle for containing rice and a proper amount of water therefor;
 (b) thermal insulating frame means for detachably placing said cooking kettle therein;
 (c) heater means disposed in said frame means, for electrically heating the kettle contents to perform main cooking and subsequent auxiliary cooking for effectively converting beta-starch to alpha-starch;
 (d) temperature detecting means disposed in said frame means, for measuring the actual temperature of said cooking kettle and for producing a detection signal corresponding to the actual kettle temperature;
 (e) first control means, connected to said temperature detecting means and said heater means, for deenergizing said heater means to complete the main cooking at a proper time in accordance with the actual kettle temperature indicated by the detection signal, and for energizing said heater means again to initiate the auxiliary cooking at another proper time;
 (f) auxiliary cooking operating time determinating means connected to said temperature detecting means, for electrically detecting a change in the actual kettle temperature represented by the detection signal after the main cooking is completed in every cooking operation, for determining the actual amount to be cooked in accordance with a change in the actual kettle temperature, and for producing a data signal indicating a reference timer operating interval corresponding to the auxiliary cooking operating time in accordance with the amount to be cooked; and
 (g) second control means, connected to said auxiliary cooking operating time determining means and said heater means, for receiving the data signal to measure the actual time interval of the auxiliary cooking operation, and for finally deenergizing said heater means when said actual time interval is equal to the reference timer operating interval, thereby completing the auxiliary cooking operation.

2. An apparatus according to claim 1, wherein said first control means stores data of a first reference temperature corresponding to the completion temperature of the main cooking and data of a second reference temperature which is lower than the first reference temperature, deenergizes said heater means when the actual kettle temperature is equal to the first reference temperature, and energizes said heater means again when the actual kettle temperature which is decreased after said heater means is deenergized becomes equal to the second reference temperature.

3. An apparatus according to claim 2, wherein said auxiliary cooking operating time determining means detects a peak temperature value which is generated when the actual kettle temperature temporarily increases after the deenergization of said heater means, and determines the actual amount to be cooked in accordance with a detected peak value.

4. An apparatus according to claim 3, wherein said auxiliary cooking operating time determining means comprises:
first circuit means connected to said temperature detecting means, for storing pieces of data respectively representing a plurality of temperature ranges, for detecting one of the plurality of temperature ranges which includes the peak value, and for generating a peak temperature signal corresponding to said one of the plurality of temperature ranges; and
second circuit means connected to said first circuit means, for storing pieces of timer operating data respectively determined in accordance with a predetermined relationship with the plurality of temperature ranges, and for selecting and producing one of the pieces of timer operating data which corresponds to said one of the plurality of temperature ranges in response to the peak temperature signal.

5. An apparatus according to claim 4, wherein said first circuit means includes:
a plurality of first memories for storing and producing a plurality of peak values spaced apart from each other at given intervals; and
a plurality of comparators, each having a first input connected to each of said plurality of first memories, a second input to which the detection signal is supplied and an output, for generating comparison signals at the outputs, respectively.

6. An apparatus according to claim 5, wherein said second circuit means includes:
a plurality of second memories for respectively storing a plurality of pieces of timer operating data, said second memories respectively having outputs from which the plurality of pieces of timer operating data are generated; and a plurality of first gate circuits, each having an input connected to the output of each of said plurality of second memories and a gate terminal connected to the output of each of said plurality of comparators, said plurality of first gate circuits each being opened and closed in response to the comparison signal and allowing one of the pieces of timer operating data stored in said plurality of second memories to pass therethrough.

7. An apparatus according to claim 4, wherein said first circuit means includes: first, second and third memories for respectively storing first, second and third peak temperature values which are sequentially increased at predetermined intervals;
first, second and third comparators respectively having first inputs to receive the detection signal, and second inputs connected to said first, second and third memories, each of said first to third comparators producing a signal having a first logic level when data supplied to the first input is equal to or greater than data supplied to said second input, and, otherwise, each producing a signal having a second logic level;
first and second transfer gates respectively having inputs which receive the detection signal, outputs connected to said first inputs of said first and second comparators, and gate terminals connected to said outputs of said second and third comparators, said first and second transfer gates being opened when the signal having the first logic level is supplied to the gate terminals thereof and being closed when the signal having the second logic level is supplied to the gate terminals thereof; and
first and second inverters respectively connected between the gate terminal of said first transfer gate and the output of said second comparator and between the gate terminal of said second transfer gate and the output of said third comparator, said first and second inverters respectively being adopted to invert output signals from said second and third comparators and to supply inverted signals to the gate terminals of said first and second transfer gates,
whereby, when the detected peak temperature value is more than the first peak temperature value, only one of said first to third comparators produces the signal having the first logic level at a given time in accordance with the relationship between the detected peak temperature value and the second and third peak temperature value.

8. An apparatus according to claim 7, wherein said third circuit means includes:
fourth, fifth and sixth memories for respectively storing first, second and third timer operating data which are decreased in the order named, said fourth to sixth memories having outputs from which the first to third timer operating data are respectively generated; and
third, fourth and fifth transfer gates having inputs respectively connected to the outputs of said fourth to sixth memories, gate terminals respectively connected to the outputs of said first to third comparators, and outputs, said third to fifth transfer gates respectively being opened when said third to fifth transfer gates receive the signal having the first logic level at the gate terminals thereof, thereby allowing the timer operating data supplied to the inputs thereof to pass therethrough.

9. An apparatus according to claim 8, wherein said second controlling means includes:
a pulse counter for receiving a clock signal and for measuring the actual time interval of the auxiliary cooking operation in accordance with the clock signal;
a seventh memory, connected to the outputs of said third to fifth transfer gates, for temporarily storing minimum timer operating time as the reference timer operating time among the pieces of timer operating data supplied thereto through said third to fifth transfer gates; and
a fourth comparator, connected to said pulse counter and said seventh memory, for comparing the actual time interval and the minimum timer operating time.

* * * * *